C. G. MICHALIS & M. MÜNZNER.
PERCENTAGE SCALE.
APPLICATION FILED SEPT. 18, 1913.
1,136,694. Patented Apr. 20, 1915.
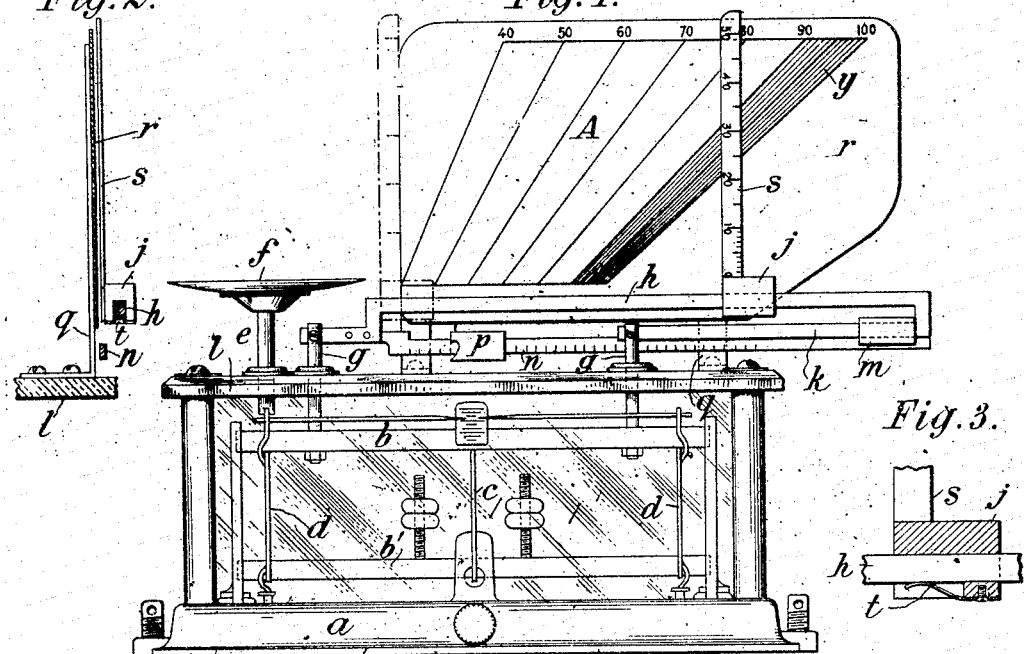
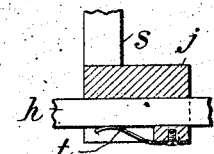
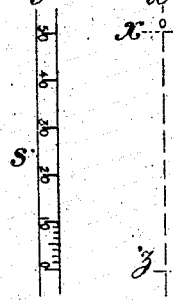
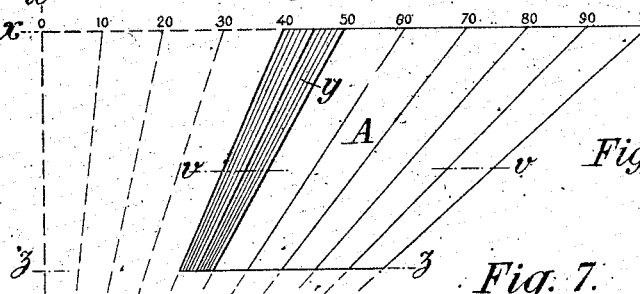
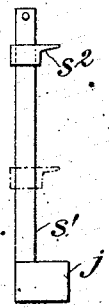
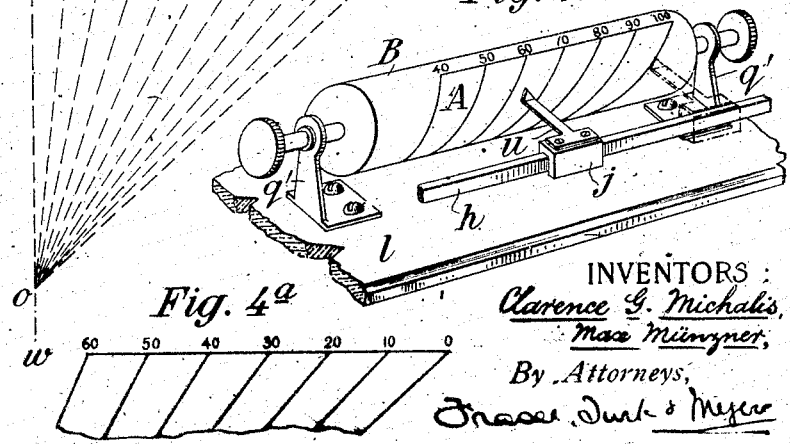
WITNESSES:
INVENTORS:
Clarence G. Michalis,
Max Münzner,
By Attorneys,

UNITED STATES PATENT OFFICE.

CLARENCE G. MICHALIS, OF EAST ORANGE, AND MAX MÜNZNER, OF ARLINGTON, NEW JERSEY, ASSIGNORS TO THE TORSION BALANCE COMPANY, OF NEW YORK, N. Y., A CORPORATION OF NEW YORK.

PERCENTAGE-SCALE.

1,136,694. Specification of Letters Patent. Patented Apr. 20, 1915.

Application filed September 18, 1913. Serial No. 790,458.

*To all whom it may concern:*

Be it known that we, CLARENCE G. MICHALIS, residing in East Orange, in the county of Essex and State of New Jersey, and MAX MÜNZNER, residing in Arlington, in the county of Hudson and State of New Jersey, both citizens of the United States, have jointly invented certain new and useful Improvements in Percentage-Scales, of which the following is a specification.

This invention provides a weighing scale or balance designed to facilitate the ascertainment of relative or proportional weights, whereby to determine the percentage of loss or gain in the weight of an article at different times of weighing, and for other analogous computations.

The object of the invention is to enable such ratios to be determined without arithmetical computation and irrespective of the weight of the sample or article being weighed. To accomplish these results the weighing scale is provided with a diagram which forms part of a triangular figure having lines radiating from a common or zero point to equidistant points along a scale graduation, the latter being developed in a horizontal line or parallel with the scale beam. The weighing scale is provided with an indicator coacting with said diagram, whereby any one of an infinitude of imaginary horizontal lines parallel with said graduations may be availed of for the purposes of any weighing operation, and whereby the initial and final weights may be read along one of such imaginary lines and their ratios determined by observation and without the necessity of any calculation. The diagram and indicator may be variously correlated, either being movable with relation to the other in a direction perpendicular to the scale beam, and the indicator being movable with the sliding counterpoise of the scale (or any other equivalent weighing means). Thus the essential operation consists in first counterpoising the scale carrying the sample to be weighed; then effecting an actual or imaginary adjustment of the diagram and pointer to bring the latter to some predetermined line of the diagram (usually a line representing 100 per cent), and thereby establishing an imaginary horizontal line; then re-weighing the same sample after treatment or another sample and reading off the second weight by the new position of the pointer on such imaginary line, whereby the percentage (or other ratio) of loss (or gain) in weight may be determined with a high degree of accuracy. The operator does not require to know the actual weight of the sample or article weighed, and hence is relieved of the necessity of preparing a sample of any prescribed weight. The only requisite is that at the successive weighings the ratios of which are to be determined, the diagram and indicator shall maintain the same relation, so that the successive readings are performed along the same imaginary horizontal line. Thus the triangulation diagram and the indicator correlated therewith, together constitute what may properly be termed a computer.

In the accompanying drawings we have shown different ways of carrying out our invention.

Figure 1 is a front elevation of a weighing scale; Fig. 2 is a fragmentary vertical transverse section thereof; Fig. 3 is a fragmentary vertical longitudinal section of the counterbalance; Fig. 4 is a diagrammatic view illustrating the complete diagram of which a portion only is used on the scale shown in Fig. 1; Fig. 4ª shows a fragment of Fig. 4 inversely graduated; Fig. 5 shows separately one form of indicator being that shown in Fig. 1; Fig. 6 is an elevation showing another form of indicator; Fig. 7 is a perspective view showing the diagram developed around the cylinder and adjustable with relation to the indicator or pointer which is carried by the scale beam.

In its mechanical features the scale shown is an ordinary torsion balance, and may be substituted by any other kind of scale as an equivalent. The scale shown in Fig. 1 comprises a base $a$, parallel beams $b$ $b'$ hung centrally on torsional wires (not shown) to a central stationary truss c and connected at their ends by torsional wires (not shown) to movable connecting trusses d d, on one of which is erected the stem e carrying the scale pan f on which is placed the object to be weighed. The upper beam b carries the usual rods g g which support a usual counterpoise beam h on which slides a slide weight or counterpoise j, all in a usual manner. This general construction of scale is so well known that no detailed illustration or description is necessary. It is shown here simply as one example of a scale to which our invention may be applied.

In the particular construction shown the counterpoise beam h is doubled to form also a beam k for receiving the compensating slide weight m, the function of which will be described hereinafter.

When for any reason it is desirable to weigh off a tare, as for example that of a receptacle containing the sample to be weighed on f, the beam h is further provided with a tare beam n on which moves a tare weight p. This tare weight and beam will be omitted in cases where there is no occasion to tare off a receptacle or perform any similar subtraction.

In the construction shown in Figs. 1 and 2 the major part of the torsion balance is inclosed in a glass case as usual, and to the stationary top plate l of this case (or to any other stationary support) there are secured uprights q which support a plate r which is best arranged in a vertical plane. On this plate r is inscribed the diagram which will be described with reference to Fig. 4. Close against the front of this plate but without quite touching it, is an upright strip s carried by the slide weight j and constituting a form of indicator. The slide weight j should be provided with some means for giving it a slight frictional cling to the beam h, such as the provision of a friction spring t as shown in Fig. 3, or any other means for preventing its accidental displacement along the beam.

The diagram A which is inscribed on the plate r is best shown in Fig. 4. In this figure the dotted lines show the theoretically complete diagram. This diagram constitutes a triangulation scale having as its base the line x x, and as its apex the zero point o. The line x x extends horizontally, that is to say, parallel with the path of movement of the slide weight j along the beam h. The line x x is graduated, as for example in fractions of 100. Ordinarily the graduations will be equidistant, but for some purposes it may be desirable to space the graduations otherwise. From the points established by the graduations on the base line x x, converging or radial lines are drawn to the apex or zero point o. Intermediate graduations may be applied as shown at y y in Figs. 1 and 4 if desired. It is apparent that the converging lines of the diagram if carried to the zero point would run together, and that for a considerable distance therefrom they would be too close to be distinguishable to the eye; for this reason that portion of the diagram nearest the apex or zero point is discarded, say for example as far back as the line z z in Fig. 4. Also it is found in practice that for most purposes the portion of the diagram toward the zero line w w is practically useless and may be discarded. In the example shown, all below 40 per cent is thus omitted.

It will be understood that within the limit imposed by the dimensions and graduations of the base line x x, the diagram A affords in theory an infinity of scale graduations, the practical limit being that of the visibly distinguishable contiguity of the converging lines which in the example is fixed by the line z z. Between the lines x x and z z any desired scale graduation can be found by ruling an imaginary line parallel to the base line x x. This will be made clear in describing the practical operation of the scale.

Let us suppose for example that it is desired to ascertain the percentage of loss of weight of any material in undergoing some given process (such for example as drying, cleaning, or freezing). A suitable quantity of the material will be roughly measured out, the operator only needing to know that the sample thus provided has a weight which is within the capacity of the scale. This sample is placed on the pan f and is weighed by counterpoising the scale by means of the slide weight j, the weight m being in the position shown. The operator will then note the point on the diagram at which the edge of the indicator strip s intersects the terminal graduation line 100; in the example shown this intersection is at the point 25 of the arbitrary vertical graduations on the strip s. The operator will note down this point (25) for future reference if the scale is to be used for any other purpose during the treatment to which the sample is next to be subjected. The sample will then be subjected to the treatment by which its weight is to be reduced. That is to say for example it may be heated to drive off its moisture content; or if grain or the like, it may be put through a cleaning or winnowing process; or it may be subjected to any other treatment the ratio of loss of weight from which it is desired to ascertain. Then, the sample after having been thus treated is placed again on the scale pan, and the slide weight j is readjusted to poise the scale. This brings the graduated indicator strip s to a different position crossing vertically the diagram A. The operator then notes the point at which the graduation 25 on the strip $s$ intersects one of the oblique lines of the diagram; let us say for example that the line thus intersected is that converging from the graduation 80; in such case the new weight of the article is to its former weight as 80 is to 100, namely 80 per cent, showing a loss of 20 per cent by the treatment. If desired the diagram A might be inversely graduated as shown in Fig. 4$^a$, in which case the operator would read at once the ratio of loss.

It will be seen that the operator in noting first the point of intersection on $s$ with the oblique line 100, and next the oblique line which on the second weighing intersects this same point of intersection, has in effect established an imaginary horizontal line across the diagram and read off his successive weights on this imaginary line. In Fig. 4 such an imaginary line is indicated by the dotted line $v$ $v$. Obviously if the sample had been a little larger so that it weighed more, this imaginary line would be higher up on the diagram; and if it had weighed less, the imaginary line would have been lower down. Thus within the limits afforded by the capacity of the scale and the limitations of the section of the diagram which is utilized, provision is made for great variety in the weight of the samples weighed, so that the operator does not need to first carefully weigh off the sample as has heretofore commonly been necessary in order to determine a percentage of loss or gain. Thus the present scale gives results in ratios quite irrespective of the actual weight of the samples weighed, provided they be within the capacity of the scale.

The function of the weight $m$ will now be explained.

It is obvious that since the diagram A which is utilized does not extend to zero weight (that is to the line $w$ in Fig. 4), and since the slide weight $j$ moves a distance only sufficient to cause the indicator $s$ to traverse the diagram, this weight in its position nearest zero still so far overweighs the scale that with an empty scale pan it would be impossible to initially adjust or poise the scale or adjust it to a true level by means of the usual leveling screws; and equally it would be impossible to subsequently test the poise or balance of the scale when empty. To carry the weight $j$ to a zero position would undesirably lengthen the beam $h$ and detract from the compactness of the instrument. Hence a separate weight $m$ is provided which in normal weighing occupies the position shown, but which when it is desired to initially poise the scale is slid as far as possible to the left, thereby shifting the center of gravity of the beam to the same extent as if the weight $j$ could be moved to the point of zero weight. Thus by resort to this second weight the instrument is kept within that length which is necessary to enable the diagram A and indicator $s$ to properly coact.

In weighing, each adjustment of the weight $j$ moves the indicator $s$ to a new position, which is equivalent to tracing an imaginary vertical line on the diagram A. The sole purpose of the graduations on this indicator is to enable the operator to observe and record the point on such vertical line at which it intersects some given or desired line of the diagram (in the example given the line 100). In Fig. 6 the indicator is shown as a vertical strip $s'$ (which need not have graduations) on which moves a sliding pointer $s^2$ which may be moved vertically to bring it to such point of intersection and then kept there during the subsequent re-weighing.

Obviously the same essential result would be attained if instead of displacing an imaginary point or a movable slide $s^2$ in vertical direction, a fixed point were established on the indicator and the diagram A were moved in a direction perpendicular to its base graduation $x$ $x$. This modification is illustrated in Fig. 7, where the slider $j$ moving on the beam $h$ carries a pointer $u$ which moves solely in a horizontal path, its tip describing an imaginary horizontal line on the diagram A, which here is wound or developed around a movable holder or carrier B, which is shown as a cylinder so pivoted between supports $q'$ as to preclude any longitudinal displacement, while admitting of its being turned under suitable friction so as to displace the diagram A and thereby bring any point on any of its oblique lines into coincidence with the tip of the pointer $u$ which here constitutes the indicator. With this modified arrangement the weighing operation is precisely the same as before except that at the first weighing, which for example brings the weight $j$ to the position shown in dotted lines, the operator has then to turn the cylinder B until the line 100 of the diagram is brought into coincidence with the tip of the pointer; the cylinder is then left in this position until the second weighing is performed, when for example the weight will bring the pointer to the position shown in full lines, $i.$ $e.$ approximately to the point 63 on the diagram, indicating a loss of weight of 37 per cent.

When the scale is to be used to determine a ratio of gain of weight instead of loss, it is only necessary to reproportion the diagram or the graduations so as to carry the latter as far as may be desired beyond the line of the diagram which indicates unit or 100 per cent. The invention lends itself to a great variety of graduations according to the particular purpose in view.

Our new percentage or computing scale has many utilizations and presents marked advantages in the quick determination of the desired result by a simple reading off from a diagram and without any computation or any reference to tables or other external helps. To enumerate a few of its uses we may mention (1) the determination of the purity of samples by finding their loss of weight between their original crude condition and their later refined or purified condition; an example of this being in the testing of grain which is first weighed with the impurities and is then cleaned and re-weighed; (2) the testing of ice cream to determine its loss of weight in freezing; (3) the testing of butter and various other articles to determine the proportion of moisture they contain; (4) the testing or standardizing of alloys containing one or more invariable components and a variable component whereby to determine the proportion of the latter; and (5) for determining specific gravities; and for numerous other purposes.

For determining specific gravities, a vessel or receptacle containing water is used. It is necessary to weigh off the tare of the receptacle, or of the receptacle plus its contained water. For this purpose the tare beam $n$ and weight $p$ are provided, the latter when not in use occupying the zero position and being displaced to the right to weigh off a tare.

For determining the specific gravity of a liquid, first weigh off the tare of the receptacle; then fill this with water and perform the first weighing as already described; then refill the receptacle with the sample liquid whose specific gravity is to be determined; then perform the second weighing and note the percentage of loss or gain of weight, which will give the specific gravity of the liquid. For specific gravities it is desirable to regraduate the scale in terms of unity for the weight of water and percentages thereof for liquids weighing less than water, and a continuation of the scale for liquids weighing more than water. For solids, the receptacle may be filled with water and the combined weight be tared off; then place the solid also on the scale and perform the first weighing, which gives the weight of the solid in air; this is read off on the 100 (or unity) line of the diagram, thus establishing the horizontal line on which the next weighing is to be read; then immerse the solid in the water, overflowing the excess of water which is displaced by the volume of the solid; then perform the second weighing, thereby determining the loss of weight due to the displacement of the water; by reading this weight on the same line the proportion is determined which gives the specific gravity. For a scale used for specific gravity alone, the diagram will be specifically scaled to read off the ratio directly.

It will be understood that our invention is independent of the particular construction of the scale or balance, and that all equivalents known to the scale-maker's art may be availed of, the illustrations given being intended only to show the best modes known to us of practising our invention.

We claim as our invention:—

1. A percentage scale comprising weighing means and a computer, the weighing means including a scale beam and slide weight thereon, and the computer comprising a diagram and indicator, said diagram having a horizontal graduated scale with divisions answering to successive positions of said slide weight and having radial lines converging from such divisions toward a focus, and said indicator mounted on the slide weight and movable therewith across said diagram, whereby at successive weighings of an object of varying weight the indicator occupies proportionately different positions on said diagram, such indicator having means adapted at a weighing operation to locate a point of intersection of the indicator with an oblique line of the diagram and thereby to establish one of an infinity of imaginary horizontal lines of the diagram, so that at a second weighing the intersection of such horizontal line with another radial line of the diagram enables the ratio of the differing weights at such two weighings to be read on said graduated scale.

2. A percentage scale comprising weighing means and a computer, the weighing means including a scale beam and slide weight thereon, and the computer comprising a diagram and indicator, said diagram having a horizontal graduated scale with divisions answering to successive positions of said slide weight and having radial lines converging from such divisions toward a focus, and said indicator mounted vertically on the slide weight and movable therewith across said diagram, whereby at the successive weighings of an object of varying weight the indicator occupies proportionately different positions on said diagram, and said indicator having vertical graduations whereby at a weighing operation to locate a point of intersection of the indicator with an oblique line of the diagram, and thereby to establish one of an infinity of imaginary horizontal lines of the diagram, so that at a second weighing the intersection of such horizontal lines with another radial line of the diagram enables the ratio of the differing weights at such two weighings to be read on said graduated scale.

3. A percentage scale comprising weighing means and a computer, the weighing means including a scale beam and slide weight, and the computer comprising a diagram and indicator, said diagram having a horizontal graduated scale with divisions answering to successive positions of the slide weight, and having radial lines converging thence toward a focus located beyond the diagram and beyond the range of movement of said slide weight, the scale beam having also a compensating weight movable from a normal weighing position to a position corresponding to the displacement of the slide weight to the zero position of said diagram, whereby to counterpoise the scale when empty to facilitate adjustment.

In witness whereof, we have hereunto signed our names in the presence of two subscribing witnesses.

CLARENCE G. MICHALIS.
MAX MÜNZNER.

Witnesses:
GEORGE M. CONWAY,
AUGUST ENGELMANN.